Oct. 5, 1965 D. R. DAYKIN 3,210,527

MAGNETIC READER

Filed June 12, 1961 2 Sheets-Sheet 1

| DIGIT | 2/5 CODE 0 | 1 | 2 | 3 | 6 |
|---|---|---|---|---|---|
| 0 | | X | X | | |
| 1 | X | X | | | |
| 2 | X | | X | | |
| 3 | X | | | X | |
| 4 | | X | | X | |
| 5 | | | X | X | |
| 6 | X | | | | X |
| 7 | | X | | | X |
| 8 | | | X | | X |
| 9 | | | | X | X |

INVENTOR
DONALD R. DAYKIN

BY [signature]
AGENT

Oct. 5, 1965 D. R. DAYKIN 3,210,527

MAGNETIC READER

Filed June 12, 1961 2 Sheets-Sheet 2

United States Patent Office 3,210,527
Patented Oct. 5, 1965

3,210,527
MAGNETIC READER

Donald R. Daykin, Vestal, N.Y., assignor to International Business Machines Corporation, New York, N.Y., a corporation of New York Filed June 12, 1961, Ser. No. 116,457
9 Claims. (Cl. 235—61.11)

This invention relates to record reading apparatus and, more particularly, to a sensing device utilizing magnetic principle to detect character representations codally stored on a record medium.

In highly competitive industry, management is charged with the task of maintaining a smooth flow of work through the manufacturing facilities. High speed data processing facilities are now available to plan and schedule the work, compute efficiencies, highlight critical situations, calculate payroll incentives, etc. One of the greatest problems facing industry today is the feedback of accurate and timely data from points remote to the high speed data processing locations. With the advent of data collecting systems the input of source data to data processing systems from remote points has been materially advanced. However, there is still a critical need for improvements in the feedback facilities for source information. It is to these needed improvements that the present invention is directed.

Accordingly, a principal object of this invention is the provision of detecting means whereby variations of magnetic conditions caused by a record element are converted into electrical data representing control signals.

Another object of the invention is the provision of detecting means responsive to discrete magnetic conditions established by a record medium in accordance with the data recorded thereon.

Another object of the invention is the provision of record reading means making use of magnetic phenomena for sensing character representations in a data bearing record medium.

Still a further object of the invention is the provision of means for sensing perforations in a ferromagnetic record medium which is reliable in operation, simple in design, and constructed in a manner for long life of operation.

Still another object of the invention is the provision of record reading means for sensing a record without the use of sensing brushes.

According to the present invention, there is provided a means making use of magnetic phenomena to sense data recorded on a record medium and to produce electrical signals to effect actuation of elements of machines such as punches, printing elements, counting circuits, data processing equipment, etc. To illustrate more specifically the application of the present invention, the instant embodiment of a badge reader for reading badges of electrically conductive or ferromagnetic material and having data codally stored therein by means of accurately positioned data representing perforations is shown to comprise a primary magnetic pole member having a plurality of energizable coil windings thereon and a secondary magnetic pole member having a plurality of sensing coil windings thereon and supported in close proximity to the primary magnetic pole member thereby providing a path into which the record can be placed. When the record member has been fully inserted into the path between the magnetic pole members, the coil windings on the primary magnetic pole member are selectively energized in a predetermined sequence. The presence of a character representing perforation in the record medium located in the proximity of a primary pole projection and a corresponding secondary pole projection causes a variation of the reluctance in the path between the pole projections thereby serving to induce a character representing signal in the coil winding on the secondary sensing pole projection which can be connected for control of a statistical machine or the like.

The foregoing and other objects, features and advantages of the invention will be apparent from the following more particular description of preferred embodiments of the invention, as illustrated in the accompanying drawings.

Figures 1, 2:
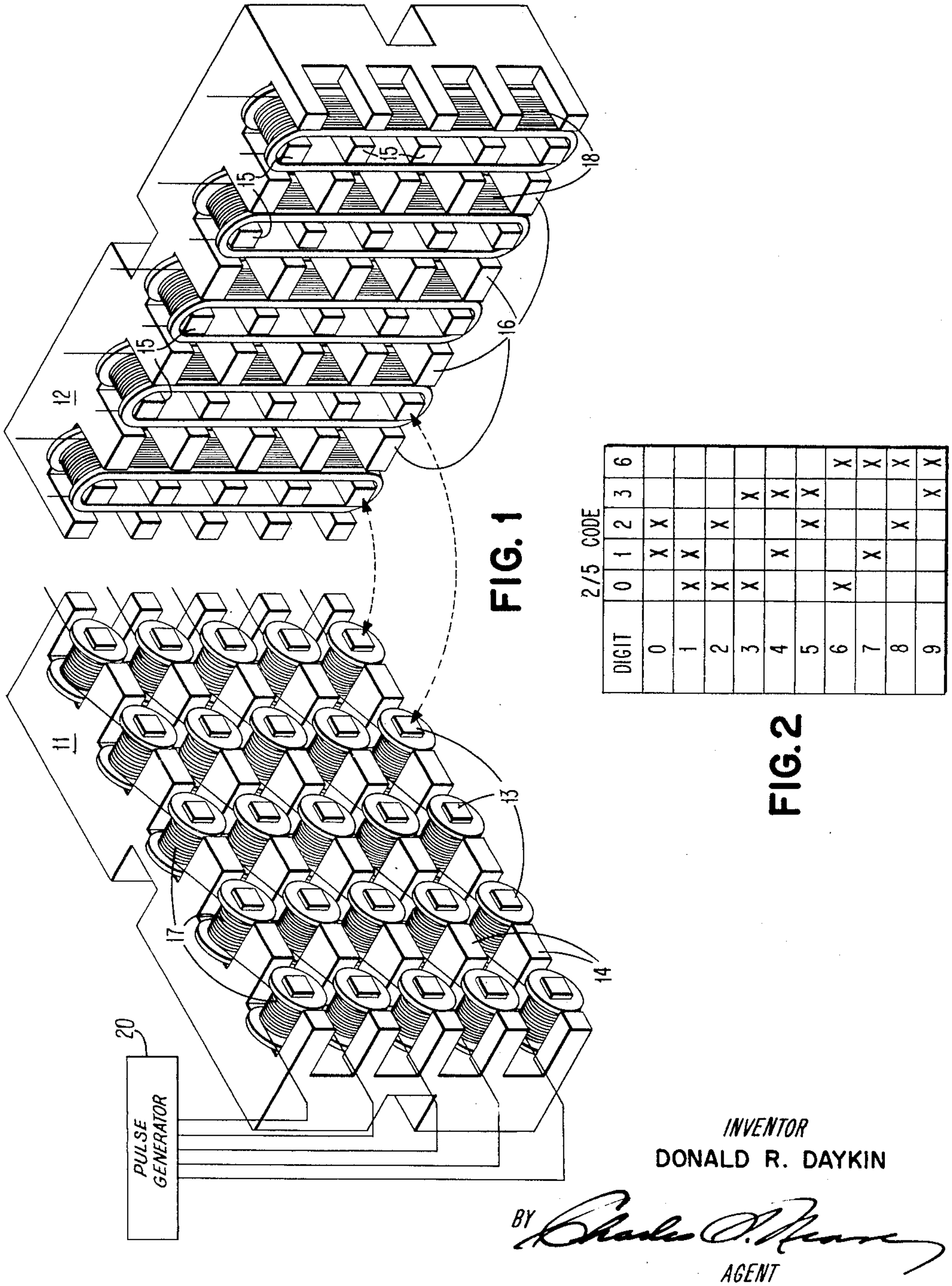
FIG. 1 is an exploded perspective view of the primary and secondary magnetic pole members and showing the coil windings thereon with means to selectively pulse the primary coil windings.
FIG. 2 is a chart showing representation of digital data in accordance with a 2-out-of-5 code.
Figures 3, 4, 5, 6, 7:
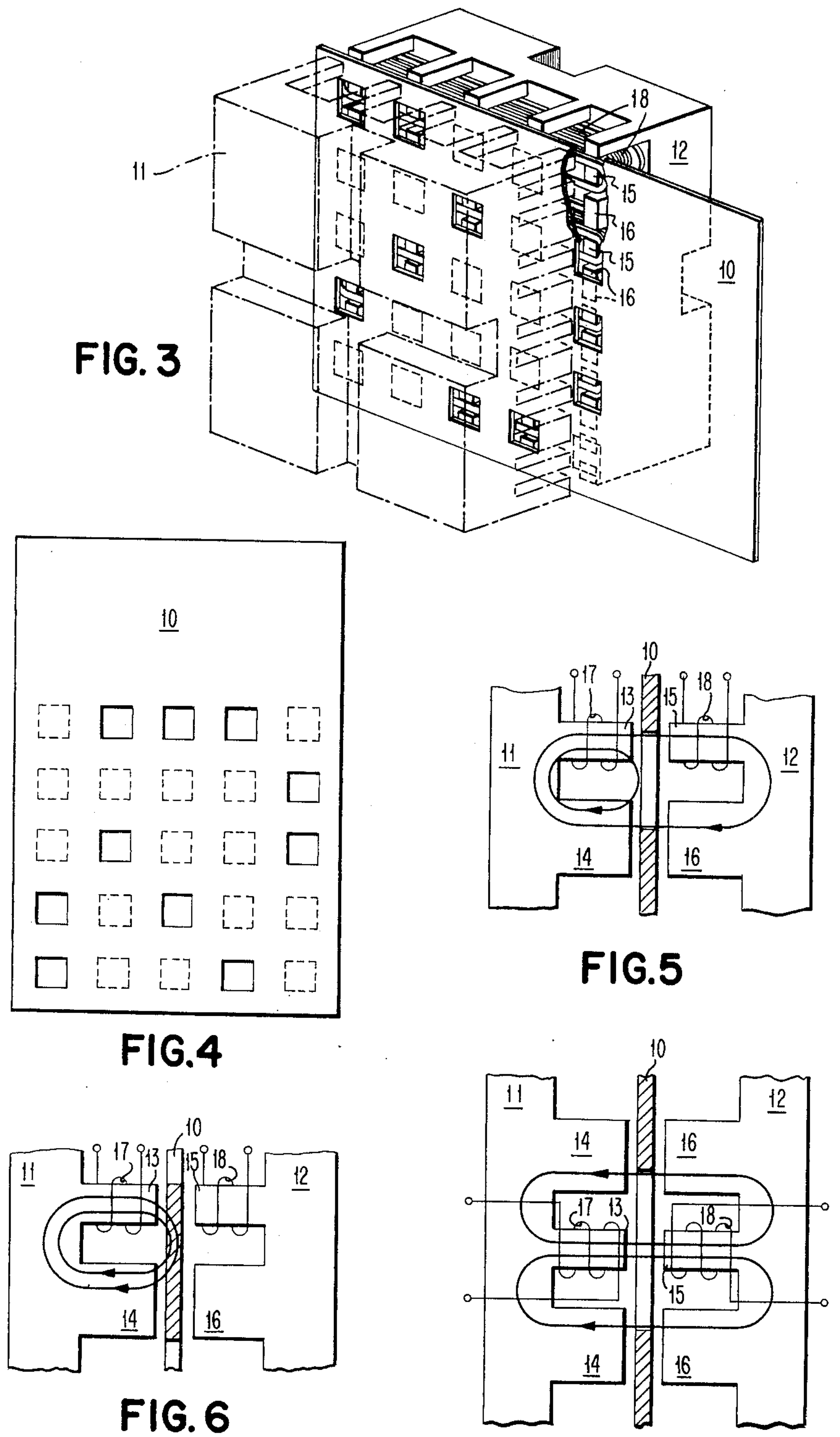
FIG. 3 is a perspective view of one embodiment of the record reading apparatus with parts broken away and showing a data bearing record medium in the path between the primary and secondary pole members.
FIG. 4 is a record medium showing the data indicating positions and having data representing perforations applied thereto and illustrating the manner in which the data may be punched into the record medium.
FIG. 5 is a view, to an enlarged scale, showing the magnetic coupling through a perforation in the record medium.
FIG. 6 is a view, to an enlarged scale, showing the magnetic shielding effect of the record medium.
FIG. 7 is a view, to an enlarged scale, showing an alternative arrangement of magnetic coupling through a perforation in the record medium.

Referring to the drawings, data is recorded on a record badge 10 or the like, FIG. 4, made of metal possessing electrically conductive or ferromagnetic properties, such as steel or Permalloy. A portion of the badge 10 is subdivided into vertical columns and horizontal rows of index point positions. The vertical columns pertain to different denominational orders. The horizontal rows are representative of the bit elements for codally representing the digital characters 0 through 9 in accordance with a 2-out-of-5 code, as shown in the chart of FIG. 2. Thus, a digital character is represented in a badge column by a pair of selectively punched holes or perforations. Other configurations for representing digital characters are equally as applicable.

The badge-like record 10 made of metal provides an inexpensive record of durable structure and is ideally suited for repetitive reading and handling. This type of record is ideally suited for use in manufacturing plants for man number, part number, and other similar identification purposes where frequent use as an input of source data is necessary.

Referring to FIGS. 1 and 3, basically the magnetic type badge-record reader is shown to comprise a primary magnetic pole member 11 and a secondary magnetic pole member 12 which for record reading purposes are supported in close proximity to each other, as shown in FIG. 3. The magnetic member 11 comprises the uniformly spaced coil winding cores 13 and the uniformly spaced flux return projections 14, as shown in FIG. 1. The magnetic pole member 12 comprises the uniformly spaced coil winding cores 15 and the uniformly spaced flux return projections 16. Thus it may be seen that the magnetic pole members 11 and 12 are of similar structure. On the primary pole member 11 the coil windings 17 are located on the cores 13 with the horizontal rows of coils 17 being interconnected in series circuit configuration, as shown in FIG. 1. On the secondary pole member 12 the column coil sensing windings 18 are located in a vertical manner with a single coil sensing winding 18 embracing all of the coil winding cores 15 in a single vertical plane.

For record reading purposes, the primary magnetic pole member 11 and the secondary magnetic pole member 12 are supported in juxtaposition mounting in close proximity to each other, as shown in FIG. 3. The badge 10 of electrically conductive or ferromagnetic material and having data character bit representing holes or perforations therein is fully inserted into the space or throat between the pole members 11 and 12 so that the bit index positions of the badge are in both horizontal and vertical alignment with the respective coil winding cores 13 and 15. To effect a reading of the data character bit representing perforations the coil windings 17 are selectively energized row-by-row from a pulse generator 20. The data character bit representing perforations will be sensed magnetically according to the principles illustrated in FIGS. 5 and 6, as will be more fully described hereinafter.

If there should be a perforation, as indicated in FIG. 5, and the coil winding 17 is energized, a magnetic flux will be created in the coil winding core 13 of the primary magnetic pole member 11. Due to the reluctance of the air gap between the coil winding cores 13 and 15 and the flux return projections 14 and 16, magnetic flux will pass through the perforation in the badge 10 and set up magnetic flux in the core 15 of the secondary magnetic pole member 12. An equal amount of flux passes in each direction through the hole or perforation so that there is no "net" algebraic flux through the perforation and no major eddy currents are set up in the metal around the perforation. Consequently, a voltage signal is induced in the sensing winding 18 which can be suitably connected with other equipment for utilization purposes.

If there is no hole or perforation in the badge when the primary coil winding 17 is energized, the resulting flux will be diverted through the ferromagnetic badge and prevented from linking the secondary magnetic pole cores 15, as shown in FIG. 6. This is due to a combination of two effects. Eddy currents will be set up in the metal in the area where the magnetic flux attempts to penetrate the metal badge 10. If the material of the badge 10 has ferromagnetic properties, the relatively low magnetic reluctance of the badge will further divert magnetic flux and prevent it from passing through the badge. Consequently, a very small voltage is induced in the secondary sensing winding 18 and is ineffective for utilization purposes.

To read the complete badge 10 an array of pole pieces as shown in FIG. 1 is used. The coil configurations shown are suitable for serial row-by-row read-out of the badge. Other configurations are possible. For example, if complete simultaneous read-out were required a separate coil could be provided for each coil winding core 15 on the secondary magnetic pole member 12. However, the need for such a read-out is minimized by the high speeds at which serial read-out can be effected. Furthermore, certain economics of construction results if a single coil for each of the columns is used, as shown in FIG. 1.

An alternative method for reading the badge 10 is illustrated by the drawing of FIG. 7. Herein the hole or perforation in the badge 10 is shown to be immediately centered over the coil winding core 13 so that the extremities of the hole or perforation overlap a portion of the flux return projections 14 and 16 on both sides of the cores 13 and 15. Thus, when the primary coil winding 17 is energized the magnetic flux created in the core 15 on the secondary pole member 12 will divide and substantially half of the flux will pass through the flux return projection 16 on each side of the core 15. In this manner adequate voltage can also be induced in the secondary coil sensing winding 18 to effect a read-out of a data bit element.

Although not restricted thereto, this invention has particular utility in data collecting systems of the type wherein data representing signals are transmitted from remote points to centrally located data processing equipment. Various other applications are possible.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A record reading apparatus comprising a primary magnetic pole member having a plurality of energizable coil windings thereon, a secondary magnetic pole member having a plurality of sensing coil windings thereon and supported in close proximity to said primary magnetic pole member so as to provide a record receiving throat into which a record element can be inserted, a record element having prepunched character representations thereon, and means for selectively energizing the coil windings on said primary magnetic pole member in a predetermined sequence in order to magnetically induce character representing voltages in said sensing coil windings in accordance with character representations stored in an inserted record element.

2. A record reading apparatus for reading an inserted record comprising a primary magnetic pole member having a plurality of symmetrically arranged core projections, coil windings inductively coupled with selected ones of said cores, a secondary magnetic pole member having a plurality of symmetrically arranged core projections corresponding to the cores of said primary magnetic pole member and in juxtaposition mounting so as to form a record receiving throat, means for selectively energizing the coil windings on said primary core projections in a predetermined sequence, a record element having prepunched character representations thereon, and windings individually and inductively coupled to the secondary core projections and responsive to changes of flux in the secondary cores in accordance with character representations stored in an inserted record for yielding character representing output pulses.

3. A record reading apparatus for reading an inserted record comprising a first magnetic pole member having a plurality of symmetrically arranged core projections, coil windings inductively coupled with selected primary core projections, a second magnetic pole member having a plurality of symmetrically arranged core projections corresponding to the cores of said first magnetic pole member and in juxtaposition mounting so as to form a record receiving throat, a record element having prepunched character representations thereon, means for selectively energizing the coil windings on said first magnetic pole member core projections in a predetermined sequence, and conductive means inductively coupled with the secondary core projections and responsive to changes of flux in the cores of said second magnetic pole member in accordance with character representations stored in an inserted record for yielding output pulses.

4. A record reading device for reading an inserted record comprising a primary substantially rectangular array of magnetic core projections, coil windings inductively coupled with selected ones of said cores, a secondary substantially rectangular array of magnetic core projections corresponding to the cores of said primary array and in juxtaposition mounting so as to form a record receiving throat, a record element having prepunched character representations thereon, means for selectively effecting a flux change in each of the wire cores of said primary array, and sense coil windings inductively coupled to the core projections of said secondary array and responsive to changes of flux in the secondary cores in accordance with character representations in a record inserted into said record receiving throat for yielding character representing output pulses.

5. A record reading device for reading an inserted record comprising a primary matrix array of magnetic cores arranged in coordinate rows and columns, the number of rows being equal to the number of bit elements for codally representing the digits 0 through 9, the number of columns being equal to the number of digital orders in the records to be sensed, coil windings inductively associated with alternate row core projections and adjacent column core projections of said primary matrix array, means for electrically connecting the coil windings in each row of said primary matrix array in series circuit, a secondary matrix array of magnetic cores arranged in coordinate rows and columns corresponding to the row and column cores of the primary matrix array and supported in spaced apart relationship with respect to the primary matrix array to form a record receiving throat, means for selectively effecting a flux change in each row of cores of said primary array, and sense windings inductively coupled to the secondary matrix array of cores and responsive to changes of flux in the secondary cores in accordance with character representations in a record inserted into said record receiving throat for yielding character representing output pulses.

6. A record readingg device for reading an inserted record comprising a primary matrix array of magnetic cores arranged in coordinate rows and columns, the number of rows being equal to the number of codal representations for the digits 0 through 9, the number of columns being equal to the number of digital orders in the records to be sensed, coil windings inductively associated with alternative row core projections and adjacent column core projections, means for electrically connecting the coil windings in each row of said primary array in series circuit, a secondary matrix array of magnetic cores arranged in coordinate rows and columns, means for energizing the row circuits of said primary array in a predetermined sequence, and sense windings inductively coupled to the secondary matrix array cores and functioning to respond to the changes of flux in the secondary cores in accordance with character representations stored in an inserted record to yield character representing pulses.

7. A record reading device for reading an inserted record comprising a primary matrix array of magnetic cores arranged in cordinate rows and columns, the number of rows corresponding to the digits 0 through 9, the number of columns being equal to the number of digital orders in the records to be sensed, coil windings inductively coupled with alternative row and column core projections of said primary matrix array, means for electrically connecting the coil windings in each row of said primary array in series circuit, a secondary matrix array of magnetic cores arranged in coordinate rows and columns and corresponding to the row and column cores of the primary matrix array and supported in spaced apart relationship with respect to the primary matrix array core projections to form a record receiving throat, means for applying energy to the rows of coil windings of said primary array in a predetermined sequence to cause changes in the magnetic condition of the cores whereby voltages are induced in the coils of the secondary array, and a sense winding inductively embracing each column of secondary cores and functioning to detect changes in the flux in the secondary cores in accordance with character representations in a record inserted into said record receiving throat for producing character representing output potentials which are dependent upon the changes of flux in said secondary cores.

8. A magnetic record sensing device for a data storing medium capable of storing digital data according to a preselected code configuration comprising a record receiver, a primary matrix array of magnetic cores arranged in coordinate rows and columns, the number of rows being equal to the number of codal representations for the digits 0 through 9, the number of columns being equal to the number of digital orders in the records to be sensed, coil windings inductively associated with alternative row core projections and adjacent column core projections, means for electrically connecting the coil windings in each row of said primary array in series circuit, a secondary matrix array of magnetic cores arranged in coordinate rows and columns corresponding to the row and column cores of the primary matrix array and supported in spaced apart relationship with respect to the primary matrix array to form a record receiving throat, means for energizing the row circuits of said primary array in a predetermined sequence, and sense coil windings inductively coupled to the secondary matrix array of cores and functioning to respond to the changes of the flux in the secondary cores in accordance with character representations in a record inserted into said record receiving throat to yield character representing pulses.

9. A magnetic record sensing device for a ferromagnetic record device including a plurality of digital positions for storing data thereat in preselected code character representations comprising a record receiver, a primary matrix array of magnetic cores arranged in coordinate rows and columns, the number of rows corresponding to the digits 0 through 9, the number of columns being equal to the number of digital orders in the record to be sensed, coil windings inductively coupled with alternative row and column core projections, means for electrically connecting the coil windings in each row of said primary array in series circuit, a secondary matrix array of magnetic cores arranged in coordinate rows and columns corresponding to the row and column cores of the primary matrix array, data representing perforations in a ferromagnetic record device serving to permit the flux created in the primary cores to pass to the corresponding secondary cores and the ferromagnetic material of the record device at the nonperforated index positions serving to shield the flux created in the primary cores from passing into the corresponding secondary cores, means for applying energy to the rows of coil windings of the primary array in a predetermined sequence to cause changes in the magnetic conditions of the cores whereby voltages are induced in the coils of the secondary matrix array, and sense coil windings inductively embracing each column of secondary core projections and functioning to detect changes in the flux in the secondary cores in accordance with character representations in a ferromagnetic record device inserted into said record receiver for producing character representing output potentials.

References Cited by the Examiner

UNITED STATES PATENTS

| | | | |
|---|---|---|---|
| 1,764,120 | 6/30 | Robbins | 235—61.11 |
| 2,685,409 | 8/54 | English | 235—61.11 |
| 2,827,604 | 3/58 | Cloud | 325—51 |
| 2,902,329 | 9/59 | Brink et al. | 340—174.1 |
| 2,992,369 | 7/61 | Rocca | 336—30 |

FOREIGN PATENTS

| | | |
|---|---|---|
| 1,105,205 | 4/61 | Germany. |
| 830,679 | 3/60 | Great Britain. |

MALCOLM A. MORRISON, *Primary Examiner.*

WALTER W. BURNS, Jr., *Examiner.*